Patented Mar. 30, 1948

2,438,753

UNITED STATES PATENT OFFICE 2,438,753

BUTADIENE-1,3-ACRYLONITRILE COPOLYMER PLASTICIZED WITH NAPHTHENIC ACID ESTERS

Henry B. Kellog, Union City, N. J., assignor, by mesne assignments, to Jasco, Incorporated, a corporation of Louisiana No Drawing. Application December 20, 1940, Serial No. 370,967

2 Claims. (Cl. 260—36)

This invention relates to plasticizers and to plastic compositions; and relates particularly to plastic and rubbery compositions containing naphthenic acid esters.

In the art of processing rubber or synthetic rubber-like materials prior to vulcanization, considerable power and work are required to get them into the proper condition for adding the compounding ingredients prior to vulcanizing. This is especially true in case of certain synthetics such as the "Buna" type rubber-like polymers and copolymers, which are much more difficult to mill and process in general than is natural rubber.

In order to overcome these difficulties in the manufacture of rubber or rubber-like articles, it has been proposed to incorporate into the rubber or rubber-like materials various substances such as oils, fats, waxes, tars and the like, which have the property, when mixed with the rubbery materials, of causing them to soften and become more plastic. In many cases, these materials have objectionable properties which render them undesirable in the rubber or rubber-like materials and recourse is had to more severe and continued working or milling of the plastic materials. It is well known that rubber and synthetic rubber-like materials become more plastic during the milling operation. It is also well known in the art that the degree of plasticity of the rubber materials will generally increase with increase in the severity and length of time of the milling. However, it is undesirable to subject rubber and particularly synthetic rubber-like materials such as the emulsion interpolymers of butadiene-acrylonitrile, butadiene-styrene, and the like, and polymers from iso-olefin-diolefin low temperature reactions, to a milling operation sufficient to give the materials the desired plasticity for shaping operations, since such lengthy mastication is uneconomical in that considerable mill capacity is necessary and the power and labor involved are excessive.

The present invention consists in the addition of small amounts of plasticizing and softening agents, comprising naphthenic acid esters to rubber or synthetic rubber-like materials, followed by thorough mixing to attain the desired plasticity, and then subjecting the plasticized rubber material to compounding, shaping and curing operations.

Thus an object of the present invention is to treat rubber or synthetic rubber-like materials whereby these materials will be rendered more plastic and may be more readily shaped. A further object is to treat rubber or synthetic rubber-like materials to render less difficult the calendering, tubing, embossing or other shaping operations prior to curing or vulcanization and substantially to eliminate the heretofore encountered difficulties. Other objects and advantages of the invention will be apparent from the following description.

According to the present invention, esters of naphthenic acids such as alkyl naphthenates, aryl naphthenates, aralkyl naphthenates, petroleum phenol naphthenates, cresyl naphthenates, alkylated phenol naphthenates, naphthenyl naphthenates, and the like are used in rubbery compounds as plasticizers or softeners. These esters have the formula

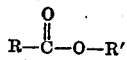

in which R is any naphthenic nucleus of a naphthenic acid, and R' is an alkyl, aryl, or naphthenyl, or any combination of these groups or their substituted derivatives.

The naphthenic acids used for the purpose of the present invention are extraction products of crude petroleum oils or distillates with alkali, that is, the crude acids are recovered by acidifying alkali sludge from the refining of mineral oils, or solutions of naphthenic acids obtained from petroleum fractions by extraction with selective solvents. The term "naphthenic acids" describes the mono cyclic acids, bi-cyclic and polycyclic acids, or mixtures of these as such or with paraffinic acids. With regard to acids of high molecular weight, there are two types, mono-cyclic $C_nH_{2n}-2O_2$ and bi-cyclic $C_nH_{2n}-4O_2$. The mono-cyclic type comprises in general the acids of 8 to 12 carbon atoms. The bi-cyclic acids contain in general from 12 to as high as 30 carbon atoms per molecule.

The naphthenic acids present in the lubricating oil portion of a Gulf Coast petroleum which have a molecular weight range of about 220 to 440 corresponding to 14 to 29 carbon atoms per molecule, are also applicable to the preparation of the naphthenic acid esters of the present invention. These high molecular weight acids are obtained after distilling gasoline and gas oil in the conventional manner from Gulf Coast crude, the reduced crude being distilled from sodium hydroxide to obtain the lubricating oil fraction. The corresponding naphthenic acids retained in the residue from this distillation as naphthenates are liberated and separated to give the naphthenic acids used in the present invention. Although naphthenic acids occur to some extent in practically all crude petroleums, or their distillates, the term "naphthenic acid" used in the description of the preparation of the esters of napthenic acids is intended to refer to any naphthenic acid regardless of the source from which it is obtained, since all naphthenic acids are effective in preparing the esters of the present invention. It is to be understood that even though it is impossible to isolate individual acids, nevertheless, comparisons of mixtures of the same boiling ranges by the amine-olefin method or of the degradation products by the progressive degradation method, indicate their similarity in properties and constitution. Similarly, oxy-naphthenic or hydroxy-naphthenic acids, obtained by oxidation of petroleum distillate fractions or mixtures thereof, may be used. Likewise, the naphthenyl alcohols produced by the catalytic reduction of naphthenic acids can be effectively utilized for preparing the esters since tests with naphthenyl naphthenates have shown them to have excellent plasticizing effects on polymeric materials.

The naphthenic acid esters used in the preparation of the plasticizers and softening agents, according to this invention, may be prepared from either low viscosity naphthenic acids such as are recoverable from kerosene distillates and light lubricating oils, or from the high viscosity acids which are recovered from highly viscous lubricating oil distillates. The desired naphthenates may be prepared from any of the naphthenic acids by reacting them with monohydroxy compounds such as methyl, ethyl, isopropyl, butyl alcohols, and alcohols in general whether primary, secondary or tertiary; with glycols such as ethylene glycol, propylene glycol; polyhydric alcohols such as glycerol; substituted alcohols such as amino-ethanol and ethylene chlorohydrin; phenolic bodies of either the mono- or poly-hydroxy type such as phenol, cresols, other alkylated phenols, dihydric phenols such as catechol, resorcinol and hydroquinone, trihydric phenols including pyrogallol as well as any of the homologs of the aforementioned phenolic compounds. The phenolic compounds recoverable from petroleum products by means of alkaline treating reagents may also be used in the preparation of the phenol naphthenates. Similarly, phenols recovered from waste liquors of various kinds by extraction with ethyl acetate can also be used. For the purpose of brevity, the phenolic compounds will hereafter be spoken of as phenols. The phenols removed by extraction with alcoholic alkali from phenol extracts of lubricating oil distillates may also be used in the preparation of the esters of the present invention.

The alcohol-ethers such as benzyl "Cellosolve," $C_6H_5CH_2OC_2H_4OH$, methyl carbitol $$CH_2OCH_2CH_2OCH_2CH_2OH$$

and phenyl "Cellosolve," $C_6H_5OC_2H_4OH$, can also be effectively employed. Similarly, the cresylic acids obtained from petroleum sources by the extraction of phenolic bodies from cracked petroleum naphtha made by commercial cracking operations can be utilized in the preparation of cresylic naphthenates. The extraction of these phenolic bodies is accomplished by scrubbing with sodium hydroxide solution, which is incidental to the refining of naphtha for the purpose of correcting color and also of mitigating noxious refinery odors. The caustic solution of phenols is then acidified with mineral acids. The separated phenolic bodies rise to the top and are recovered and purified.

Any of the accepted methods of esterification may be used in the reaction of the mono or polyhydroxy organic compounds with the naphthenic acids. The most desirable method consists in reacting a given quantity of the naphthenic acid with an excess of alcohol, glycol, or phenol at elevated temperatures and preferably under a vacuum. Sulfuric acid or dry hydrochloric acid gas are excellent catalysts for this reaction.

The various esters of naphthenic acids may also be prepared by the method, well known in the art, of reacting the acid chloride with the other reacting constituent in the presence of an alkaline material which serves to neutralize the free hydrochloric acid liberated in the course of the reaction. As an example of this method of synthesis, a quantity of naphthenic acid is refluxed with an excess of thionyl chloride at an elevated temperature whereby the corresponding acid chlorides of the naphthenic acids are obtained. The so-formed acid chlorides are separated from any remaining thionyl chloride and are then reacted with an alcohol, phenol etc. In the presence of an alkali such as potassium carbonate whereby the desired esters are obtained.

The preferred method of preparing the various esters of naphthenic acids with phenols consists of the steps of dissolving stoichiometrical amounts of the naphthenic acids and the phenol, in toluene or xylene and heating the mixture to the boiling point of the toluene or the xylene while refluxing under a vertical condenser having attached thereto a water trap, whereby the water settles to the bottom of the trap and the condensed liquid (xylene or toluene) flows back into the reaction vessel. In the case of low boiling alcohols, glycols, and the like, a fractionating column is preferably utilized in the preparation of the corresponding esters.

The naphthenic acids suitable for use in the present invention may be obtained from gas oil of Columbian crude oil. A typical naphthenic acid cut has the following analysis:

Sp. gr. _____ °A. P. I. 15.7 (0.961)
Acid No _____ 202
Saponification No _____ 208

Suitable petroleum phenols for use in the present invention may be obtained as by-products in the refining of petroleum oil. In their preparation a substantial portion of the crude petroleum is "topped" to remove the lower boiling hydrocarbons which boil within the gasoline range, and the "topped" crude is cracked for the production of additional quantities of gasoline boiling range hydrocarbons. A residual heavy petroleum fraction, boiling at temperatures above the gasoline boiling range, remains. This is suitable for use as a fuel oil stock but it is commonly treated with a strong aqueous caustic solution. This treatment separates from the heavy petroleum fraction, a dark viscous material which is insoluble in the aqueous caustic, but which settles out of the heavy oil fraction, along with the excess caustic, forming a three layer system of which the upper layer is the purified fuel oil stock; the intermediate layer consists of crude sodium phenate salt; and the bottom layer is the surplus aqueous caustic soda solution. These layers are separated from the top heating oil layer, which is then in purified form ready for shipment and use. The bottom, caustic soda solution, layer is suitable for re-use in the washing and purification of further portions of heavy fractions.

The middle layer contains the crude sodium salts of the desired phenate substances. These crude compounds are washed with petroleum ether or naphtha to remove residual hydrocarbons and the crude salts are then treated with carbon dioxide or a dilute mineral acid in sufficient quantity to combine with the sodium of the phenate salts and to liberate only the desired phenols, any naphthenic acid salts present being kept wholly undecomposed. The liberated phenols are then separated from the solution and purified by distillation, preferably under reduced pressure. If still higher purity is desired, the phenols may be redistilled under vacuum. The boiling range of the phenols so obtained is usually substantially higher than the boiling range of the petroleum fraction from which they are obtained. By redistillation the phenolic compounds can readily be freed from hydrocarbons and other impurities such as the naphthenic acids.

The following detailed procedure is suitable for the recovery of the pure phenols:

A sample of acid treated heating oil from cracked East Texas crude was contacted in an agitator with 0.15 pound per barrel of 40° Bé. caustic soda. Three layers were formed, of which the bottom layer was a caustic soda solution which could be reused, the intermediate layer, dark in color, contained the phenols, and the top layer was the caustic-washed oil. These layers were separated and the intermediate layer was extracted three times with 10% by volume of naphtha and then acidified with carbon dioxide for the precipitation of the phenols. Approximately 0.16% of crude phenols, based on the heating oil treated, were obtained. Inspections of these crude phenols were as follows:

Gravity—A. P. I. _____ 6.8
Color (Robinson) _____ Black
Per cent water _____ 20
Distillation—A. S. T. M. ° C.:
    Initial boiling point _____ 98.9
    5% off at _____ 102.2
    10% off at _____ 102.2
    20% off at _____ 110.0
    30% off at _____ 218.3
    40% off at _____ 230.6
    50% off at _____ 238.9
    60% off at _____ 250.0
    70% off at _____ 265.0
    80% off at _____ 284.4
    90% off at _____ Cracked
    95% off at _____ Cracked The crude phenols were then vacuum distilled, the initial boiling point being about 30° C. at 5 mm. pressure. Various cuts were taken off up to about 240° C. at 5 mm. pressure; the residue remaining in the still was a hard, tar-like solid. A sample of such phenols was fractionated and refractionated three times, the following fractions of the specified carbon hydrogen proportions being obtained in the last fractionation:

| Fraction | Boiling Range ° C. at 2 mm. pressure | Per cent C | Per cent H |
|---|---|---|---|
| 1 | 30–70 | | |
| 2 | 70–80 | | |
| 3 | 80–90 | 78.7 | 9.06 |
| 4 | 90–100 | 78.89 | 9.36 |
| 5 | 100–110 | | |
| 6 | 110–120 | 78.98 | 9.55 |
| 7 | 120–130 | 79.38 | 9.35 |
| 8 | 130–140 | | |
| 9 | 140–150 | | |
| 10 | 150–160 | 79.6 | 9.23 |
| 11 | 160–170 | 79.99 | 9.3 |
| 12 | 170–180 | | |
| 13 | 180–210 | 80.86 | 8.87 |

The petroleum phenols may be characterized as containing a total of about 9 to 25 carbon atoms per molecule with about 3 to 17 of these carbon atoms present in saturated hydrocarbon groups, which show a hydrogen deficiency as compared to the hydrogen content of straight-chain alkyl groups. This deficiency of hydrogen can be ascribed to the presence of cyclo-aliphatic hydrocarbon groups. Thus, while the saturated hydrocarbon substituents of petroleum phenols may be considered as paraffinic, they do not have the paraffinity of simple alkyl groups. Moreover, analysis of fractions of these phenolic substances shows that they contain more oxygen than could be accounted for by the phenolic group, as can be seen from the following analytical data:

A sample of petroleum phenols obtained from fraction 7 was fractionated into four portions and the following cuts obtained:

| Fraction | Boiling Range ° C. | Per cent C | Per cent H | Per cent O (by Diff.) |
|---|---|---|---|---|
| 1 | 85–120 at 6 mm | 79.09 | 9.06 | 11.85 |
| 2 | 120–130 at 6 mm | 79.35 | 9.16 | 11.49 |
| 3 | 130–140 at 6 mm | 78.19 | 8.82 | 12.99 |
| 4 | 140–150 at 6 mm | 80.66 | 8.54 | 10.80 |

Fraction 3 on further analysis was found to contain more oxygen as shown by the following analysis:

Percent carbon _____ 78.19
Percent hydrogen _____ 8.82
Probable impirical formula _____ $C_{12}H_{16}O_{1.5}$
Molecular weight (calc.) _____ 184
Molecular weight (found) _____ 190.3
Sap. No. of acetylated product (calc.) _____ 340
Sap. No. of acetylated product (found) __ 256.67

It can be seen that if the oxygen atoms were phenolic, the acetylated product would have a saponification number of 340 mg. of KOH/gm. If only one of the oxygen atoms per molecule were phenolic the saponification number would be 246 which is in reasonable agreement with the value of 256 as found in the analysis.

The following detailed procedure illustrates the extraction of phenols from heavy distillates:

Heavy Talang Akar kerosene (15 gallons), which had been previously treated with aqueous alkali and which boiled substantially above 500° C., was extracted with one-half gallon of methyl alcohol containing one-half pound of potassium hydroxide. The mixture was centrifuged, the alcohol layer distilled, and upon acidification of the distillation, residue 128 grams of crude phenols were recovered. These were vacuum distilled at 5–8 mm. pressure.

The phenolic compounds so obtained are generally liquid mixtures varying in viscosity and boiling point, the values of these properties increasing with increase in boiling point of the petroleum source of material. These phenols contain from about 10 carbon atoms per molecule to 27 carbon atoms or more.

In the higher boiling fractions, there is a deficiency in hydrogen which indicates the presence of more than one nucleus or of condensed nuclei.

The preferred plasticizer of the present invention consists of an ester of petroleum phenol with naphthenic acid. In view of the fact that these esters are relatively little known, the following methods for the preparation thereof are presented.

For the esterification, 238 parts of naphthenic acids having an acid number of 235 were mixed with 178 parts of petroleum phenols, the actylated product of which had a saponification number of 256. This mixture was then dissolved in 400 parts of xylene containing 7 cc. of concentrated sulfuric acid as a catalyst. This mixture was then heated to the boiling point of xylene and refluxed under a column for 12 hours. After the calculated amount of water was liberted, the heating of the mixture was discontinued and it was allowed to cool. The xylene in the solution of the ester was stripped under vacuum and a liquid product, petroleum phenol naphthenate, having a boiling point of 140–150° C. at 10 mm. was obtained. This product was used as the plasticizer.

Alternatively, other naphthenates are useful, such as the naphthenic acid esters of the simple alcohols. For the preparation of isopropyl naphthenate, 150 parts of naphthenic acid having a molecular weight of approximately 238 were mixed with 37.8 parts of isopropyl alcohol, and dissolved in 200 parts of anhydrous toluene containing 4 parts by volume of concentrated sulfuric acid; the acid serving as catalyst. This mixture was heated and refluxed under a fractionating column to separate the water and the toluene. After the calculated amount of water was freed from the mixture, to indicate thereby, the end of the esterification procedure, the mixture was cooled and the acid neutralized by anhydrous sodium acetate. The solution was then separated from the precipitated sodium sulfate and the toluene and acetic acid were stripped from the mixture under vacuum. The finished isopropyl naphthenate was recovered as a liquid of light yellow color.

*Example 1*

To illustrate as a specific example one embodiment of the invention, a rubber-like material was selected which was difficult to plasticize. This material, known to the trade as Perbunan (an emulsion interpolymer of butadiene and acrylonitrile), was selected. Perbunan cannot be plasticized by treatment with hot air to produce a worthwhile improvement in its working properties. It is, therefore, necessary to mill Perbunan in order to plasticize it before compounding. This preliminary milling or breakdown does not produce the same visible effect that milling of natural rubber does. Nevertheless, this breakdown of Perbunan is most important for its further processing. Although some softeners such as dibenzyl ether, phthalic acid esters and triphenyl phosphate when incorporated into Perbunan in the preliminary milling are taken up so as to cause an improvement in the extruding properties and an increase in the tackiness of the raw compound, they do not, however, increase the tackiness and breakdown of the raw material as readily and within as short a period of time as do the naphthenic acid esters.

*Example 2*

A sample of Perbunan stock was divided into three portions. One was used as a blank, or control, the second was mixed with fifteen grams of petroleum phenol naphthenate which was incorporated into 100 grams of the stock. In evaluating the third portion, fifteen grams of a commercially available and widely used plasticizer, a commercially available coal tar phenol was incorporated in order to make a comparison of the plasticity improvement.

In comparing the plasticizing effect of the petroleum phenol naphthenate with the other plasticizer, a Williams Plastometer (Williams, Ind. and Eng. Chem. 16, 362, 1924) was employed.

The test results set forth in the following table were obtained from samples of the Perbunan stock as above described:

|  | Plasticity | Recovery |
|---|---|---|
| Perbunan Blank (control) | 216 | 61 |
| Perbunan compounded with a commercial phenolic coal tar derivative | 178 | 30 |
| Perbunan compounded with the petroleum phenol naphthenate | 165 | 20 |

In order to ascertain whether the phenolic naphthenates have any deleterious or injurious effects upon the rubber stock after curing, the synthetic rubber-like polymer used in the previous example was compounded as follows:

|  | Parts |
|---|---|
| Perbunan (butadiene-acrylonitrile emulsion polymer) | 100 |
| Petroleum phenol naphthenate | 15 |
| Zinc oxide | 5 |
| Carbon black | 45 |
| Stearic acid | 1½ |
| Sulfur | 2 |
| Santocure (condensation product of mercaptobenzothiozol with cyclo hexyl amine) | ⅝ |
| D. P. G. (diphenyl guanidine) | ⅝ |

This composition was segregated into four equal portions which were cured at 287° F. for fifteen, thirty, forty-five and sixty minutes, respectively. After curing the product did not show any blistering or any injurious or deleterious effects.

*Example 3*

Similar results were obtained when the test material employed was isopropyl naphthenate, or phenol naphthenate, or cresyl naphthenate, or di-naphthenic acid ester of ethylene glycol, or naphthenyl naphthenate. Good plasticity and recovery, as well as lack of blistering or other deleterious effects upon curing were observed when using these esters.

Where ease of milling and calendering is desired, it is well to use a substantial percentage of naphthenic acid esters. The use of 2% or 3% to 5% of such esters in any ordinary batch will permit of much easier milling. The naphthenic acid esters of the present invention will impart softness and free milling properties and can be used for that purpose. They are perfectly satisfactory in white stocks and can be used in amounts as high as 15 to 20% of the rubber, particularly in sponge stocks where it is necessary to plasticize and soften the stock very thoroughly.

The esters of naphthenic acids of the present invention possess remarkable solvent properties for a large number of plastics, as they contain a high degree of naphthenicity which is exceedingly beneficial in the plasticizing and softening action.

The esters of the present invention may also be used in the treatment of natural and other synthetic rubber-like materials and the like for purpose of retarding deterioration thereof and are particularly useful as age registers or antioxidants in oder to increase the useful life of such materials. They can be effectively used for such a purpose in amounts ranging from 2 or 3% to as high as 5%.

In view of the excellent plasticizing effect of the naphthenic acid esters, they are not only valuable in plasticizing rubber or synthetic rubber-like masses, but are equally valuable in the reclamation of vulcanized rubber or synthetic rubber-like materials. The naphthentic acid esters of the present invention can be effectively utilized in the devulcanization of rubber to obtain a reclaimed rubber product possessing characteristics of the original rubber or rubber-like material prior to vulcanization.

By the process and product of the present invention, there is thus produced a series of compounds of especial value for plasticizing or softening rubber, synthetic rubber and similar compositions requiring plasticization.

While there are above disclosed but a limited number of embodiments of the invention, it is possible to produce still other embodiments without departing from their invention concept herein disclosed, and it is, therefore, desired that only such limitations be imposed upon the appended claims as stated therein or required by the prior art.

I claim:

1. A plasticized composition comprising butadiene-acrylonitrile emulsion interpolymer and a naphthenic acid ester of petroleum phenols.

2. A method of increasing the plasticity and improving the milling properties of an emulsion interpolymer of butadiene and acrylonitrile, comprising the step of milling into the polymer a naphthenic acid ester of petroleum phenol.

HENRY B. KELLOG.

REFERENCES CITED

The following references are of record in the file of this patent:

UNITED STATES PATENTS

| Number | Name | Date |
| --- | --- | --- |
| 2,016,392 | Schneider | Oct. 8, 1935 |
| 2,180,721 | Roon | Nov. 1, 1939 |
| 2,236,296 | Minich | Mar. 25, 1941 |

OTHER REFERENCES

Carothers, Collected Papers, vol. I, pp. 391–392 (1940).